(12) United States Patent
Osterman

(10) Patent No.: US 7,617,767 B2
(45) Date of Patent: Nov. 17, 2009

(54) ROASTING APPARATUS

(75) Inventor: Charles Osterman, Howell, MI (US)

(73) Assignee: Allaround Sports, Inc., Howell, MI (US)

( * ) Notice: Subject to any disclaimer, the term of this patent is extended or adjusted under 35 U.S.C. 154(b) by 641 days.

(21) Appl. No.: 11/368,974

(22) Filed: Mar. 6, 2006

(65) Prior Publication Data

US 2006/0196367 A1     Sep. 7, 2006

Related U.S. Application Data

(60) Provisional application No. 60/658,685, filed on Mar. 4, 2005.

(51) Int. Cl.
*A47J 37/04* (2006.01)
(52) U.S. Cl. ............... 99/421 H; 99/421 A; 99/449; 211/198; 211/204; 248/175; 426/523; 426/520
(58) Field of Classification Search ............. 99/449, 99/419, 421 H, 421 HH, 421 R, 421 A; 211/60.1, 211/70.1, 198, 204; 248/174, 175; 426/523, 426/520
See application file for complete search history.

(56) References Cited

U.S. PATENT DOCUMENTS

| 181,387 | A | * | 8/1876 | Yost | 271/278 |
|---|---|---|---|---|---|
| 1,061,431 | A | * | 5/1913 | West | 99/419 |
| 2,634,674 | A | * | 4/1953 | Irwin | 99/419 |
| 2,847,932 | A | * | 8/1958 | More | 99/421 H |
| 3,081,694 | A | * | 3/1963 | Lipsey | 99/341 |
| 4,407,189 | A | * | 10/1983 | Bentson | 99/421 HH |
| 5,801,357 | A | * | 9/1998 | Danen | 219/403 |
| 5,819,639 | A | * | 10/1998 | Spell | 99/421 H |
| 5,887,513 | A | * | 3/1999 | Fielding et al. | 99/421 A |

* cited by examiner

*Primary Examiner*—Reginald L Alexander
(74) *Attorney, Agent, or Firm*—Gifford, Krass, Sprinkle, Anderson & Citkowski, P.C.

(57) ABSTRACT

A roasting apparatus for cooking meat in an oven includes a rod, a pair of hooks and a frame. The rod extends between opposite ends along a longitudinal axis. The pair of hooks are coupled to said rod and spaced apart to retain the meat therebetween on the rod. The frame has a pair of spaced apart and generally upright end walls for supporting respective ends of the rod. The end walls are pivotally coupled to a bottom wall for movement between a collapsed position and an upright use position. A pair of side walls is hookingly engageable with the side walls to maintain the side walls in the use position.

13 Claims, 3 Drawing Sheets

ROASTING APPARATUS

CROSS REFERENCE TO RELATED APPLICATION

This application claims priority to U.S. provisional patent application No. 60/658,685, which was filed on Mar. 4, 2005 and is incorporated herein by reference in its entirety.

BACKGROUND OF THE INVENTION

1. Field of the Invention

The invention relates to a roasting apparatus for roasting meat in an oven. More particularly, the invention relates to a roasting apparatus that is collapsible to facilitate storage when not in use.

2. Description of the Related Art

Typically, whole turkeys are cooked in ovens with the breast side facing upwardly in a cooking pan, which provides a stable position for the turkey while cooking and maintains the proper carving position. This, however, results in dry or otherwise overcooked breast meat. From time to time people attempt to roast the turkey so that the breast side faces downwardly during the cooking cycle. This allows juices from the darker thigh meat to trickle to the breast area during cooking, resulting in moist breast meat. Cooking a turkey breast side down also allows for it to be cooked to the right temperature. The proper cooked temperature for the breast meat is 10 degrees less that that of the legs and thighs. Considering that a normal roasting oven is 10 degrees hotter near the top of the oven, a turkey cooked with the breast near the top of the oven will be 20 degrees over cooked. A turkey cooked with the breast positioned in the lower part of the oven will be cooked to a proper degree of doneness.

Cooking the turkey with the breast side down can, however, create problems. In order to carve the turkey, it must be flipped back to breast side up. This is very difficult to do and poses dangers from being burned in the process. Thus, it remains desirable to provide a roasting apparatus that supports the turkey while roasting with the breast side down and that facilitates rotation of the turkey during the cooking cycle, while minimizing the risk of burning oneself.

SUMMARY OF THE INVENTION

According to one aspect of the invention, a roasting apparatus is provided for cooking meat in an oven. The roasting apparatus includes a rod, a pair of hooks and a frame. The rod extends between opposite ends along a longitudinal axis. The pair of hooks are coupled to said rod and spaced apart to retain the meat therebetween on the rod. The frame has a pair of spaced apart and generally upright end walls for supporting respective ends of the rod.

According to another aspect of the invention, a method is provided for roasting a bird in an oven. The method includes the steps of: providing a roasting apparatus having a rod and a frame adapted to support and maintain the rod in one of a plurality of rotated positions; securing the bird on the rod utilizing hooks slidably supported on the rod; placing the rod along a top edge of a support frame such that the breast side of the bird is facing downwardly; heating the oven to approximately 325° F.; partially cooking the bird; lifting, rotating and returning the rod along the top edge of the support frame so that the breast side of the bird is facing upwardly; and cooking the bird until the temperature in the breast meat registers between 160-165° F. and the leg meat registers between 165-170° F.

BRIEF DESCRIPTION OF THE DRAWINGS

Advantages of the present invention will be readily appreciated as the same becomes better understood by reference to the following detailed description when considered in connection with the accompanying drawing, wherein.

DETAILED DESCRIPTION OF THE INVENTION

The present invention provides a roasting apparatus for cooking meat within an oven. The roasting apparatus allows meat to be supported above a surface in the oven so that all outer surfaces of the meat are open to the oven environment and supports the meat in a desired position. The roasting apparatus is collapsible to facilitate storage when not in use.

Figure 1:
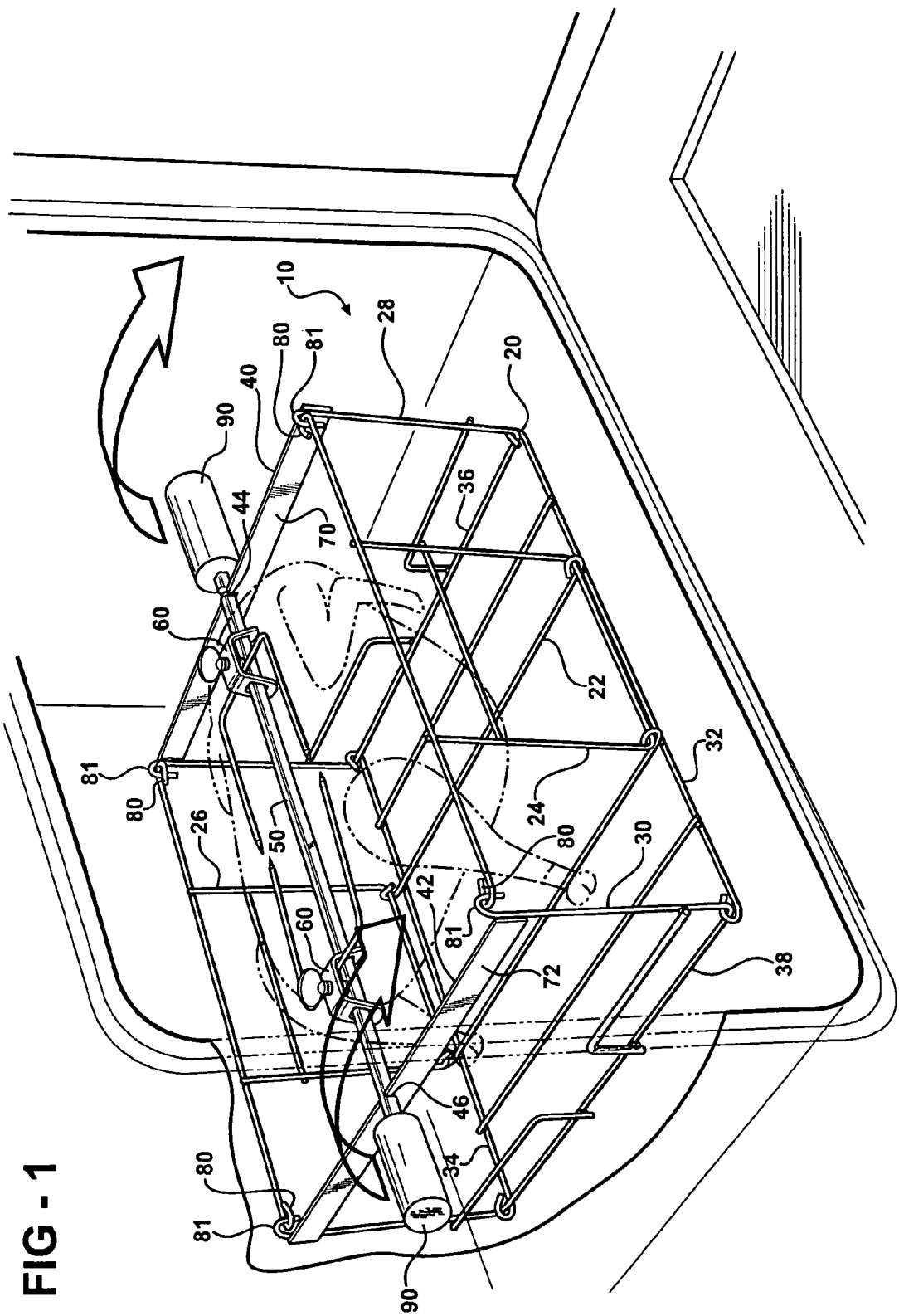
FIG. 1 is a perspective view of a roasting apparatus according to one embodiment of the invention, as shown in an oven.
Figure 2:
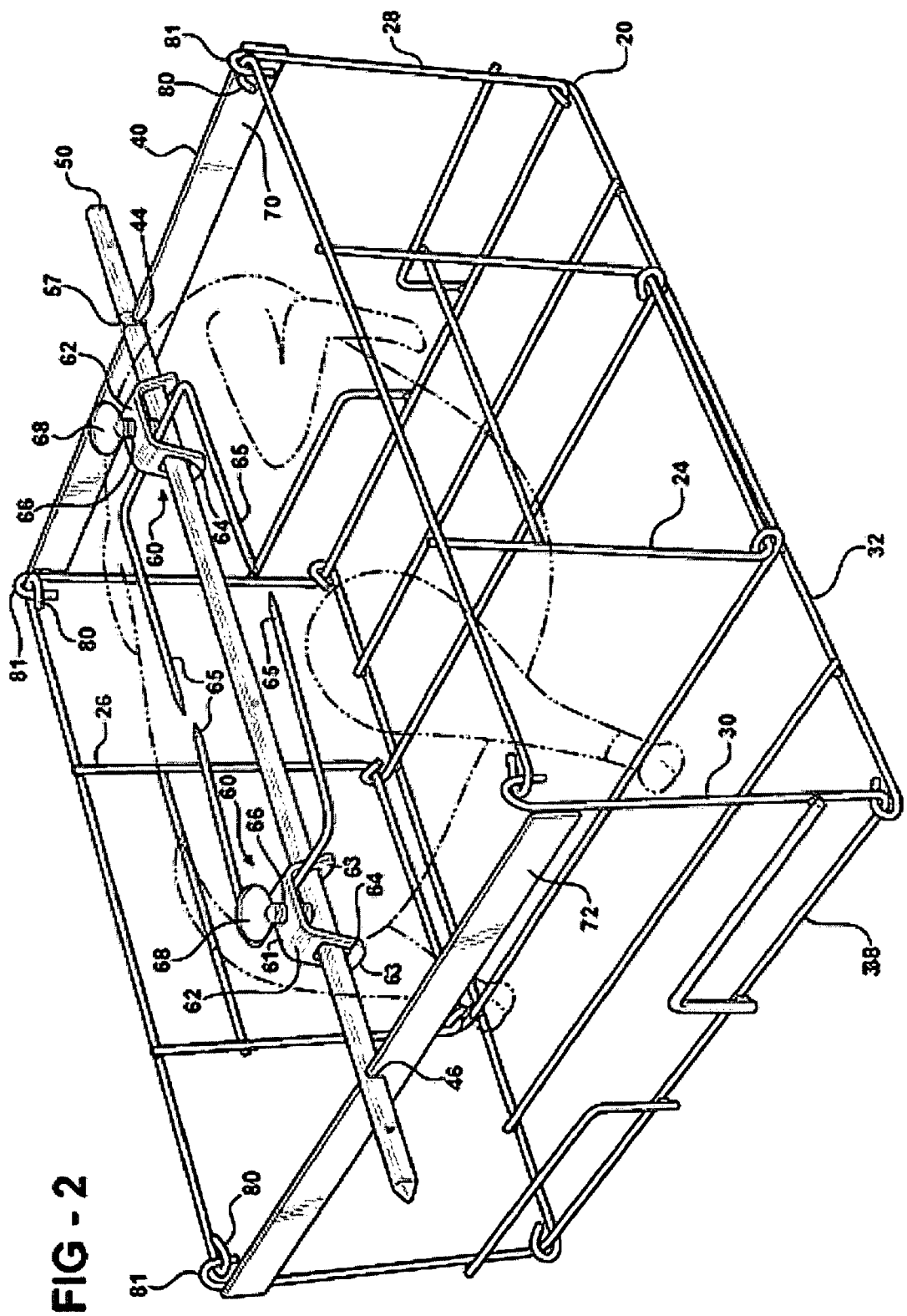
FIG. 2 is a perspective view of the roasting apparatus in a use position.
Figure 3:
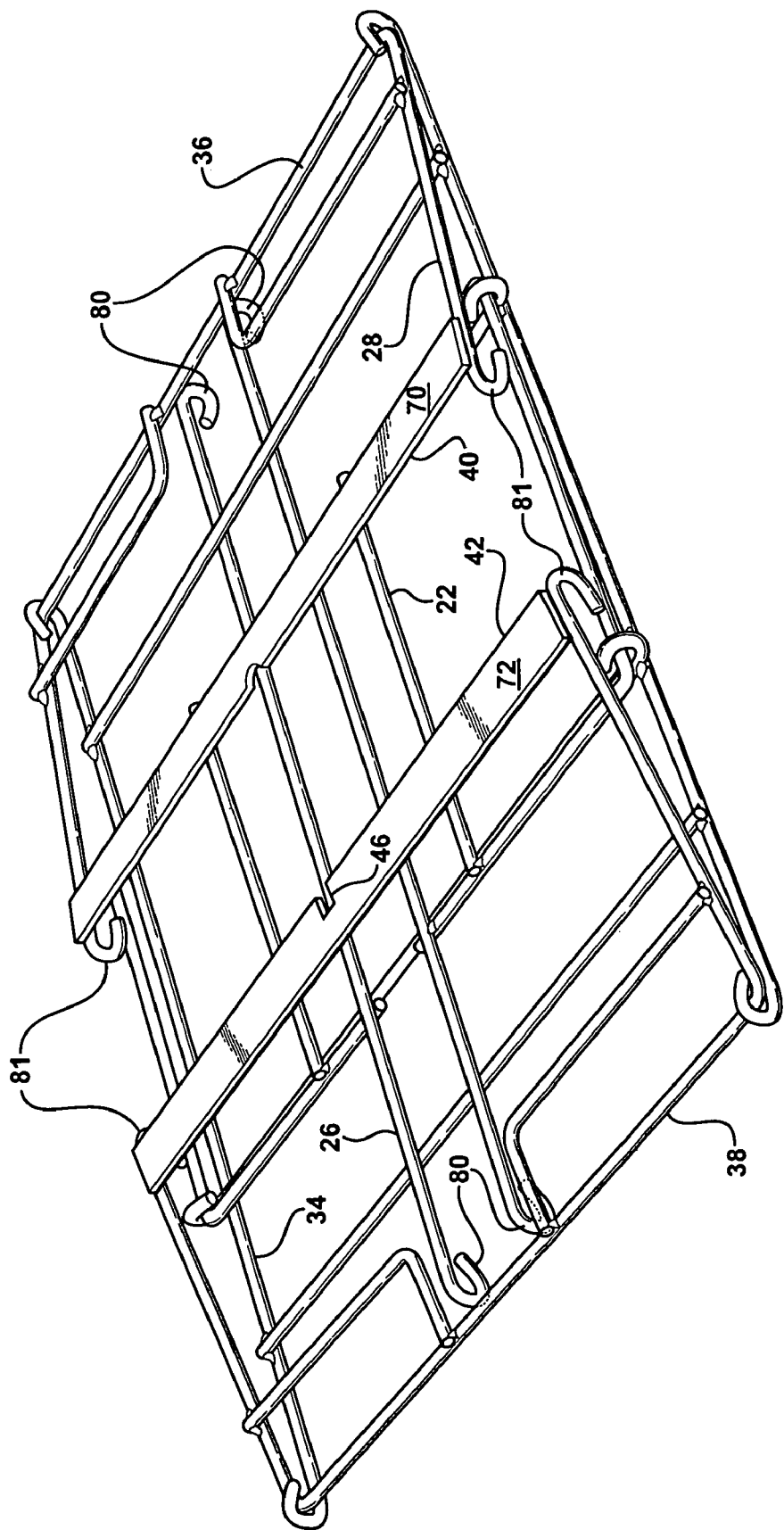
FIG. 3 is a perspective view of the roasting apparatus in a storage position.

Referring to FIGS. 1-5, a roasting apparatus is generally indicated at 10. The roasting apparatus 10 includes a support frame 20. The support frame 20 includes a bottom or base wall 22, a pair of side walls 24, 26 and a pair of end walls 28, 30, which are arranged to form a rectangular box having an open top. More specifically, the base wall 22 is rectangular and defines the bottom of the rectangular box. The base wall 22 includes opposite sides 32, 34 forming the length of the base wall 22. The base wall 22 includes opposite ends 36, 38 forming the width of the base wall 22. The side walls 24, 26 extend orthogonally from the opposite sides 32, 34 of the base wall 22. The end walls 28, 30 extend orthogonally from the opposite ends 36, 38 of the base wall 22. Each end wall 28, 30 includes a top edge 40, 42. An upwardly extending notch 44, 46 is formed in the top edge 40, 42 of each end wall 28, 30.

The roasting apparatus 10 includes a rod 50. The rod 50 is of sufficient length to be supported on the top edges 40, 42 of the end walls 28, 30. The rod 50 may be seated in the notches 44, 46 to prevent the rod 50 from sliding along the top edges 40, 42 of the end walls 28, 30. The rod 50 has a cross sectional having at least has one flat edge, wherein the cross section is defined in a plane substantially orthogonal to the longitudinal axis of the rod 50. As shown in the figures, the rod 50 has a square cross sectional shape. One of the notches 46 has a shape corresponding to the cross sectional shape of the rod 50 to prevent rotation of the rod 50 while seated in the notch 44. The rod 50 has a groove 57 seated in the other notch 44 to axially constrain the rod 50 relative to the support frame 20.

The roasting apparatus 10 includes a prong 60. The prong 60 includes a collar 62. The collar 62 includes a pair of angled walls 63 extending from opposite ends of a center wall 61. The angled walls 63 include aligned center apertures 64 for slidably receiving the rod 50 therethrough. A plurality of L-shaped hooks or arms 65 extend outwardly from the collar 62 for insertion into the meat to be cooked. A threaded bore 66 is formed in the center wall 61 of the collar 62. The threaded bore 66 is transverse with respect to the center aperture. A thumb or set screw 68 is threadingly engaged with the threaded bore 66. The thumb screw 68 can be tightened so that an end of the thumb screw 68 frictionally engages the rod 50 to maintain the position of the collar 62 relative to the rod 50.

The walls 22, 24, 26, 28, 30 of the support frame 20 are formed by welding steel rod members together. Specifically, each wall 22, 24, 26, 28, 30 includes parallel upper and lower members extending between parallel side members. The upper member 70, 72 of each end wall 28, 30 is formed from a strip of steel. The strips of steel provide a rigid support for the rod 50.

The walls 24, 26, 28, 30 are pivotally coupled to the base wall 22 so as to be collapsible over the base wall 22 to facilitate storage of the support frame 20. Hooks 80, 81 are formed at the upper corners of each wall 24, 26, 28, 30, allowing the walls 24, 26, 28, 30 to be locked in an upright support position with respect to the base wall 22.

In use, the rod 50 is inserted through a food item to be cooked, such as a whole turkey or chicken. Opposite ends of the rod 50 are inserted through the center bores 64 of respective prongs 60. The arms 65 are pointed inwardly toward the food. The prongs 60 are pressed toward the food item so that the arms 65 extend into the food item. The thumb screw 68 is tightened until the end of the thumb screw 68 engages the rod 50, thereby locking the positions of the prongs 60 relative to the rod 50. The rod 50 is placed onto the top edges 40, 42. Specifically, the rod 50 is seated in the notches 44, 46 to prevent sliding of the rod 50 along the top edges 40, 42 of the end walls 28, 30. The groove 57 of the rod 50 is seated in the notch 46 to constrain the rod 50 axially relative to the support frame 20. The entire roasting apparatus 10, with the food item supported thereon, is inserted into an oven for cooking of the food item. The corresponding non-circular shapes of the rod 50 and notches 44, 46 prevents rotation of the rod 50, which allows the food item to be cooked in a fixed position. Optionally, heat-shielding grips 90 may be utilized to allow rotation of the rod 50 during the cooking cycle to prevent one from burning one's hands on the heated rod 50. Optionally, a roasting pan may be seated on the base wall 22 and positioned between the walls 24, 26, 28, 30 for catching juices from the food item. The entire roasting apparatus 10, with the food item supported thereon and with the roasting pan supported on the frame 20, may then be inserted into the oven for cooking of the food item.

The invention also provides a method of roasting a food item utilizing the inventive roasting apparatus 10. Illustratively, the method is now described for cooking a whole turkey of any size. First, an oven is pre-heated to 325 degrees Fahrenheit. The rod 50 is inserted through the main cavity of the turkey. Opposite ends of the rod 50 are inserted through the center bores 64 of respective prongs 60. The arms 65 are pointed inwardly toward the turkey. The prongs 60 are pressed toward each other so that the arms 65 extend into the turkey. The thumb screw 68 of each prong 60 is tightened until the end of the thumb screw 68 engages the rod 50, thereby locking the positions of the prongs 60 and turkey relative to the rod 50. The rod 50 is placed onto the top edges 40, 42. Specifically, the rod 50 is seated in the notches 44, 46 to prevent sliding of the rod 50 along the top edges 40, 42 of the end walls 28, 30. The groove 57 of the rod 50 is seated in the notch 46 to constrain the turkey and the rod 50 axially relative to the support frame 20. The entire roasting apparatus 10, with the turkey supported thereon, is inserted into the pre-heated oven. The turkey is positioned with the breast side down. The corresponding non-circular shapes of the rod 50 and notches 44, 46 prevent rotation of the rod 50, which maintains the turkey with the breast side down.

Depending on the size of the turkey, the total cooking will vary. Once 75% of the cooking time is completed, rod 50 is lifted from the notches 44, 46 and rotated so that the turkey is positioned with the breast side up. The rod 50 is placed on the notches 44, 46 to maintain the turkey in the position with one side up. The turkey is cooked for 25% of the cooking time with the breast side up or until a meat thermometer inserted into the breast area registers 160-165 degrees Fahrenheit and the leg/thigh area registers approximately 170 degrees. The turkey is removed from the oven and allowed to rest for 30 minutes before carving. Excess fat and drippings may be discarded or utilized for basting or gravy. It should be appreciated that at anytime before, during or after the above cooking process, the turkey may be seasoned, stuffed, basted as desired.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A roasting apparatus for cooking meat in an oven, the roasting apparatus comprising:
   a rod extending between opposite ends along a longitudinal axis;
   a prong slidably mounted along the rod so as to secure the meat to the rod;
   a frame including a base, the base having a pair of spaced apart and generally upright end walls for supporting respective ends of the rod, and a pair of spaced apart side walls, wherein each of the pair of end walls and each of the pair of side walls are pivotably mounted to the base so as to move between a use position and a stowed position, wherein in the use position, the pair of side walls and the pair of end walls extend generally orthogonally from the base, and wherein in the stowed position, the pair of end walls and the pair of side walls are pivoted about the base so as to be placed in an overlapping relationship with each other; and
   wherein each of the pair of side walls includes a pair of first hooks, and wherein each of the pair of first hooks is disposed on opposing ends of each of the pair of side walls; and
   wherein each of the pair of end walls includes a pair of second hooks disposed on opposing ends of each of the pair of end walls, and wherein each of the pair of second hooks is configured to releasably engage each of the corresponding pair of first hooks, and wherein the pair of first hooks are engaged with the pair of second hooks so as to place the frame in the use position, and wherein the pair of first hooks are released from the pair of second hooks so as to place the frame in a stowed position.

2. A roasting apparatus as set forth in claim 1, wherein the prong includes a clamping mechanism for maintaining the prong in a desired position along the rod.

3. A roasting apparatus as set forth in claim 2, wherein the prong includes a collar slidably supported on the rod, the prong having at least one outwardly extending arm for insertion through the meat.

4. A roasting apparatus as set forth in claim 3, wherein the clamping mechanism includes a set screw threadingly engaged with the collar for selectively locking the position of the prong relative to the rod.

5. A roasting apparatus as set forth in claim 1, wherein the frame includes a rectangular shaped bottom wall that extends between the end walls.

6. A roasting apparatus as set forth in claim 1, wherein each of the end walls includes a top edge surface for supporting the ends of the rod.

7. A roasting apparatus as set forth in claim 6, wherein each top edge surface includes a notch configured to receive the rod therein.

8. A roasting apparatus as set forth in claim 7, wherein the rod includes at least one flat surface, and wherein the at least one flat surface is configured to lockingly engage the notch so as to prevent the rod from rotating relative to the frame.

9. A roasting apparatus as set forth in claim 7, wherein each top edge surface is formed from a rectangular strip of steel, and the notch is formed along a portion of the strip of steel.

10. A method of roasting a bird in an oven, the method comprising the steps of:
 providing a roasting apparatus having a rod and a frame adapted to support and maintain the rod in one of a plurality of rotated positions;
 providing heat-shielding grips, and mounting the heat-shielding grips onto each end of the rod;
 securing the bird on the rod utilizing hooks slidably supported on the rod;
 placing the rod along a top edge of a support frame such that the breast side of the bird is facing downwardly;
 heating the oven to approximately 325 F.;
 placing the roasting apparatus and the bird in the oven;
 partially cooking the bird;
 lifting, rotating and returning the rod along the top edge of the support frame so that the breast side of the bird is facing upwardly; and
 cooking the bird and removing the rod and the bird when the temperature in the breast meat registers between 160-165° F. and the leg meat registers between 165-170° F.

11. The method as set forth in claim 10 including the step of fixing the position of the hooks relative to the rod using set screws.

12. The method as set forth in claim 10 including the step of inserting the rod into a slot formed along die top edge of Pie support frame to prevent the rod from sliding relative to the support frame.

13. The method as set forth in claim 10 including the step of cooking the bird until approximately 75% complete prior to rotating the bird to breast side facing up.

* * * * *

UNITED STATES PATENT AND TRADEMARK OFFICE
CERTIFICATE OF CORRECTION

| | | |
|---|---|---|
| PATENT NO. | : 7,617,767 B2 | Page 1 of 1 |
| APPLICATION NO. | : 11/368974 | |
| DATED | : November 17, 2009 | |
| INVENTOR(S) | : Charles Osterman | |

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 641 days.

should read (*) Notice: Subject to any disclaimer, the term of this patent is extended or adjusted under 35 U.S.C. 154(b) by 868 days.

Column 6, Line 13 - delete "die" and insert --the--
Column 6, Line 13 - delete "pie" and insert --the--

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,617,767 B2 |
| APPLICATION NO. | : 11/368974 |
| DATED | : November 17, 2009 |
| INVENTOR(S) | : Charles Osterman |

It is certified that error appears in the above-identified patent and that said Letters Patent is hereby corrected as shown below:

Title page, item (*) Notice:   Subject to any disclaimer, the term of this patent is extended or adjusted under 35 U.S.C. 154(b) by 868 days.

Delete the phrase "by 868 days" and insert -- by 897 days --.

Signed and Sealed this

Seventeenth Day of August, 2010

David J. Kappos
*Director of the United States Patent and Trademark Office*